E. LUCKWILL.
DIFFERENTIAL LOCKING GEARING.
APPLICATION FILED OCT. 28, 1909.
954,748.
Patented Apr. 12, 1910.
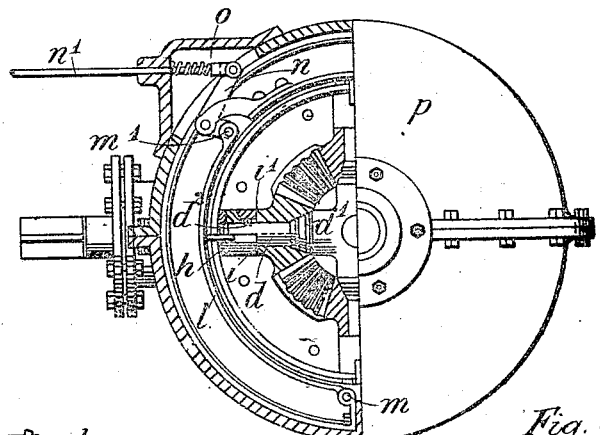
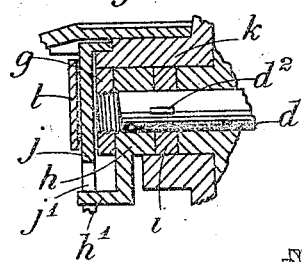
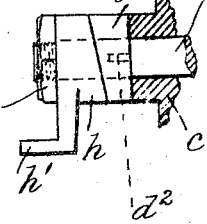
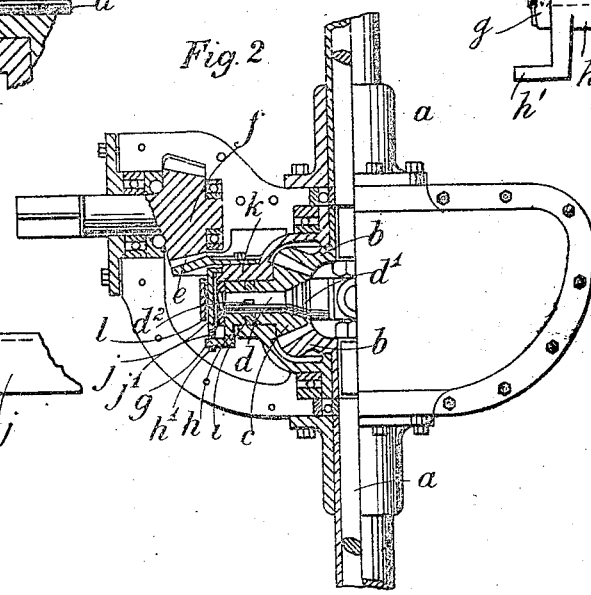
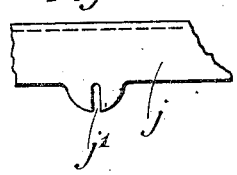
Witnesses:
Geo C. Poulton
L. B. Middleton
Inventor.
Edwin Luckwill,
by Herbert W. Jenner.
Attorney.

UNITED STATES PATENT OFFICE.

EDWIN LUCKWILL, OF CARDIFF, ENGLAND.

DIFFERENTIAL LOCKING-GEARING.

954,748.   Specification of Letters Patent.   Patented Apr. 12, 1910.

Application filed October 23, 1909. Serial No. 525,120.

*To all whom it may concern:*

Be it known that I, EDWIN LUCKWILL, residing at 73 Broadway, Roath, Cardiff, England, have invented certain new and useful Improvements in Differential Locking-Gearing; and I do hereby declare the following to be a full, clear, and exact description of the invention, such as will enable others skilled in the art to which it appertains to make and use the same.

This invention relates to improvements in and connected with differential gearing for road vehicles, the object being to provide improved and more efficient means whereby the live axles of the differential gearing may be locked so as to rotate in unison when desired, as for instance, when the vehicle brake is applied while passing over a greasy surface, in order to minimize the risk of side-slip or skidding due to the differential gearing being inadvertently brought into action, as is well understood. It has previously been proposed to attain this end in connection with the differential gearing of a traction engine by employing a brake band furnished with projections designed to enter recesses in the bevel pinions to prevent their independent rotation, such band being operated by a lever, but the present invention consists essentially in providing frictional contact surfaces by means of which the said pinions are locked, and in order that the invention may be more fully understood, it will now be described with reference to the accompanying drawings, in which:—

Figure 1 is a half sectional elevation of a differential gearing constructed according to this invention, Fig. 2 is a half sectional plan thereof, and Fig. 3 is a longitudinal section through one of the cam-mechanisms drawn to a larger scale. Fig. 4 is a detail of a portion of the operating-ring. Fig. 5 is a detail side view of one of the cam-mechanisms.

As shown in the drawings, the live axles $a$, $a$, carry bevel pinions $b$, $b$, of the satellite gears in the usual manner, these pinions $b$ meshing with four pinions $c$ carried upon spindles $d$ radiating from a common center and revolving bodily with and carried by the casing and the crown-wheel $e$, the teeth of which wheel mesh with the teeth of the driving pinion $f$ which is secured on the driving-shaft. Each spindle $d$ is formed with a conical part $d^1$ against which the corresponding shaped internal surface of the pinion $c$ bears and the space between the pinion $c$ and a nut $g$ at the opposite extremity of the spindle $d$ is occupied by two sleeves or collars $h$, $i$, (shown in enlarged detail in Fig. 3), formed with juxtaposed cam faces as shown in Fig. 1, the sleeve or collar $h$ having a crank or arm $h^1$ engaging a slot $j^1$ in a loose band $j$ (Fig. 4) passing around the satellite gear casing $k$ and the sleeve or collar $i$, a keyway $i^1$ in the sleeve or collar $i$ being engaged by a key or feather $d^2$ carried by the spindle $d$. Concentric with the band $j$ is the strap $l$ of the band brake pivoted as at $m$ (Fig. 1) and as at $m^1$ to a bell crank lever $n$ connected to a rod $n^1$ operated by a foot pedal or the like.

The operation of the device is as follows:—In ordinary practice, the gearing is to all intents and purposes, the usual differential gearing, but when desired, as hereinbefore described, upon the application of the brake strap $l$ to the band $j$, rotation is checked which has the effect of partially turning the sleeve or collar $h$ thus causing the sleeve or collar $i$ to slide upon the spindle $d$ and jam the conical surfaces of the pinion $c$ and spindle $d$ together, thus effectually locking the pinion $c$ and necessitating the axles $a$, $a$, continuing to revolve together in the same direction. The gears are unlocked either by the thrust or by a suitable spring or springs, while it is preferred to provide an inspection cover $o$ to the differential gearing casing $p$ as shown in Fig. 1.

It is obvious that the details of construction of this device may be varied considerably without departing from the spirit of this invention, the essential feature of which consists of the temporary locking of the planet pinions by means of frictional surfaces.

Having now described my invention, what I claim as new and desire to secure by Letters Patent is:—

1. The combination, with a differential gearing comprising gear-wheels and pinions operatively connected together, a revoluble casing or spider supporting the said parts, and non-revoluble shafts mounted in the said pinions, said shafts and pinions being provided with opposed friction clutch-members; of cams carried by the said shafts and provided with projecting arms and adapted to operate the friction clutch-members to lock the said pinions to the said shafts, and an operating ring encircling the said differential gearing and operatively connected with the said arms.

2. The combination, with a differential gearing comprising gear-wheels and pinions operatively connected together, a revoluble casing or spider supporting the said parts, and non-revoluble shafts mounted in the said pinions, said shafts and pinions being provided with opposed friction clutch-members; of cams carried by the said shafts and provided with projecting arms and adapted to operate the friction clutch-members to lock the said pinions to the said shafts, and an operating ring mounted to oscillate on the said casing or spider and operatively connected with the said arms.

In testimony whereof I affix my signature, in presence of two witnesses.

EDWIN LUCKWILL.

Witnesses:
ALEX GREGOR, Jur.,
ALBERT S. PHILLIPS.